May 1, 1962 J. M. SULLIVAN 3,032,346
CLOSURE FOR ROTATABLE MEMBERS
Filed Aug. 8, 1958

INVENTOR
JAMES M. SULLIVAN
BY Edward H. Goodrich
HIS ATTORNEY

United States Patent Office 3,032,346
Patented May 1, 1962

3,032,346
CLOSURE FOR ROTATABLE MEMBERS
James M. Sullivan, Elmwood, Conn., assignor to General Motors Corporation, Detroit, Mich., a corporation of Delaware
Filed Aug. 8, 1958, Ser. No. 754,071
1 Claim. (Cl. 277—168)

This invention relates to a closure or seal for insertion between a pair of spaced relatively rotatable members and particularly to a closeure for extending across the annular lubricant space between a pair of relatively rotatable antifriction bearing members and which maintains lubricant within the bearing and at the same time prevents the entrance of water and other deleterious materials into the bearing.

With the continued requirements of industry for better and more precise mechanisms, there is an increasing demand for antifriction bearings which will operate at high speeds for long periods without attention. Consequently, there is need for simply constructed and inexpensive seals or shields which may be quickly and easily installed in the ends of bearings with a minimum of effort and which will effectively seal lubricant within a bearing while preventing the entrance of deleterious materials into the bearing. Heretofore, seals and shields as commonly used to close the ends of an antifriction bearing have usually comprised several metal discs and yieldable washers which had to be carefully assembled at time of installation and then secured within the end of a bearing. There have also been various forms of molded seals, but these have been cumbersome, complicated arrangements which in many instances additionally had to be held in position by metal rings which were difficult to install.

It is, therefore, an object of this invention to provide an improved closure of simple construction and which may be quickly and easily installed as a unit in the annular space between a pair of relatively rotatable members.

It is a further object of my invention to provide an improved reinforced annular closure and which may be quickly and easily installed across the end of a lubricant chamber in an antifriction bearing.

Another object of my invention is to provide an improved closure for the end of an antifriction bearing and which is deformably and sealingly received in unit-handling relation within the bearing without imparting distorting stresses to the bearing.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

Figures 1, 2:
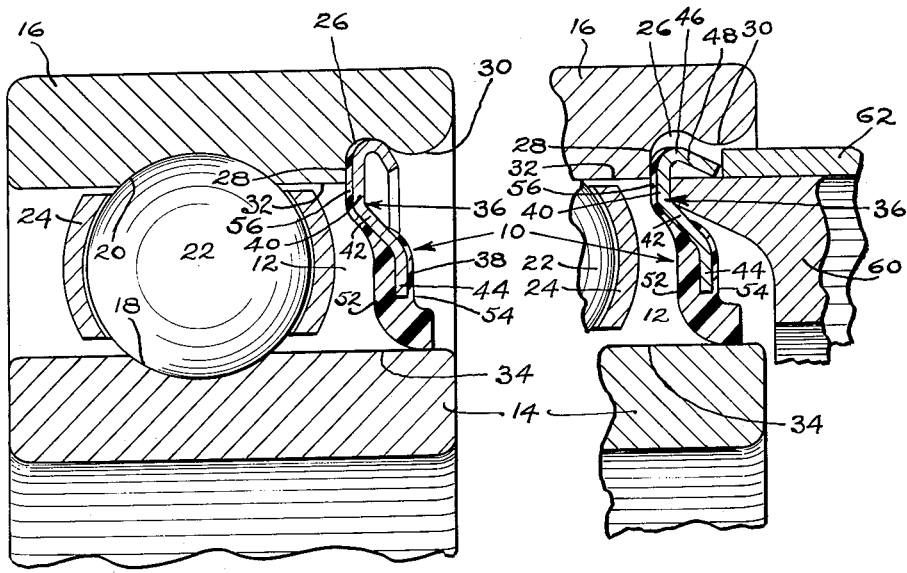
FIGURE 1 is a cross sectional view of a portion of an antifriction bearing having one form of my sealing device.
FIGURE 2 is a fragmentary cross sectional view of the bearing showing the method of installation of my sealing device within the bearing.

My improved closure as 10, is illustrated in closing relation across the end of an annular lubricant chamber 12 between a pair of relatively rotatable members, as the inner and outer race rings 14 and 16 of an antifriction bearing. These race rings are provided with the usual raceways 18 and 20 which receive rolling elements, as balls 22, guided by a separator 24. One or both ends of one of these race rings, as the outer race ring 16, is respectively provided with an annular groove 26 which is transversely curved between an annularly extending generally radial disposed shoulder 28 and a transversely rounded annularly extending land 30. The groove 26 radially opens towards the other race ring and this groove preferably merges with the shoulder 28 at one side and merges with the rounded land 30 at its other side. The diameter of the land 30 is interemdiate between that of the bottom of the groove 26 and that of an inner cylindrical surface 32 of the race ring 16 at the side of the raceway 20. The other race ring, as 14, may have a cylindrical surface as 34 against which the seal 10 is in lightly wiping sealing relation.

My unit-handling closure 10 comprises a stamped out sheet metal reinforcing ring 36 about which is bonded a resilient sealing washer 38 that radially extends into lightly wiping sealing contact with the cylindrical surface 34. This reinforcing ring which is first bent to the form shown in FIGURE 2, has a substantially radial flat annular portion 40 and is preferably dished outwardly as by an intermediate frusto-conical wall 42 which connects with an inner generally radial portion 44 thus providing more lubricant capacity for the chamber 12. The outer periphery of the reinforcing ring 36 is laterally bent over at 46 to a diameter slightly less than that of the rounded land 30 and has an inwardly directed frusto-conical flange 48.

The sealing washer 38 is formed of a suitable inherently resilient material which is yieldably deformable and pjermanently bonded to the reinforcing ring 36 as by a vulcanizing operation which may occur during the molding or by otherwise forming and cementing this sealing washer about the reinforcing ring. This washer 38 may be composed of various rubber-like materials which will not deteriorate or appreciably alter resiliency in the presence of heat, light and/or bearing lubricants. One satisfactory rubber-like material for this washer 38 comprises a resilient vulcanized synthetic rubber which contains a polymerization product of butadiene and acrylic nitrile. The radial portion 44 and part of the frusto-conical reinforcing ring portion 42 is embedded in this sealing washer which has a pair of generally radially extending inner and outer side walls 52 and 54 extending past the flat radial portion 44 and to an inner diameter which is less than that of the cylindrical surface 34. The upper portion of the wall 54 blends into the frusto-conical portion 42 intermediate its radial width and the wall 52 extends inwardly in generally conforming relation to the frusto-conical portion 42 and thence radially outwardly to provide a thin flat resilient sealing portion 56 bonded to the radial wall 40 and preferably extending to the laterally bent-over portion 46 of the ring 36. It will thus be appreciated that I have provided a resilient rubber-like sealing washer of unitary construction having a metal reinforcing ring partially embedded therein.

During assembly, with the parts in the position illustrated in FIGURE 2, a ram 60 is forced against the flat annular radial portion 40 to locate the thin sealing washer 56 against the radial shoulder 28 of the race ring 16. A sleeve 62 slidably mounted over the ram 60 is now forced inwardly into engagement with the outer end of the angularly disposed annular flange 48 bending it inwardly and radially outwardly causing the bent-over periphery 46 to radially expand to the position shown in FIGURE 1 thus securely mounting the seal in desired position. As shown in FIGURE 1, it will be noted that the bent-over lip now provides an annular rim on the reinforcing ring 36 which wedges against a side wall of the groove 26 without necessarily bottoming in this groove.

This wedging fit causes the thin yieldably resilient wall 56 to sealingly and deformably seat against the radial wall 28 thus permanently locating the seal in desired position without producing any objectionable distorting forces on the race ring 16. At this time, the inner radial portion of the resilient sealing washer 38 laterally bends over forming a resilient lip that maintains a lightly wiping sealing relation with the cylindrical surface 34 as illustrated. This lip has sufficient resiliency to maintain effective sealing contact even if the race rings should shift out of their normally coaxial relation during rotation.

Figures 3, 4:
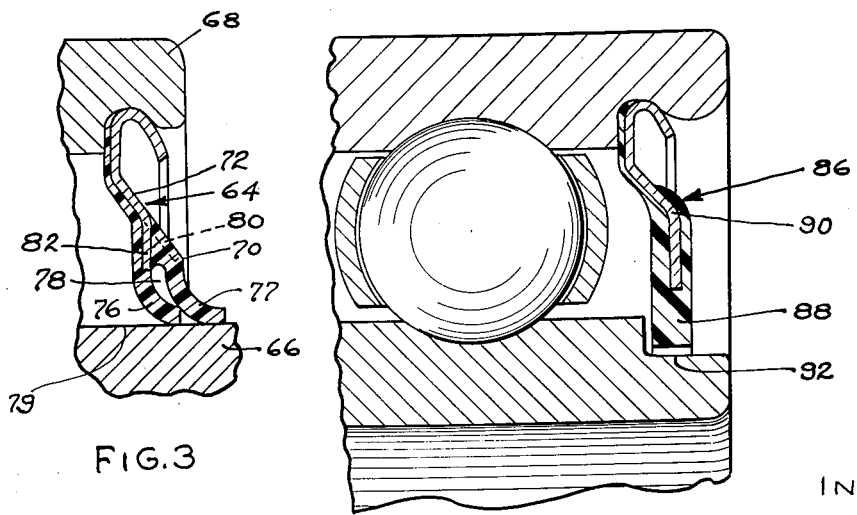
FIGURE 3 is a cross sectional view of a portion of an antifriction bearing illustrating another related form of my sealing device.
FIGURE 4 is a cross sectional view of a portion of a bearing showing my closure installed in the form of a shield.

In the embodiment of FIGURE 3, an annular seal 64 is secured in closing relation between a pair of relatively rotatable race rings 66 and 68 in generally the same manner as described with respect to FIGURES 1 and 2. In this seal 64, a synthetic rubber sealing washer 70, which is molded about a stamped bent to form reinforcing ring 72, is bifurcated at its inner radial portion to provide a pair of resiliently deformable laterally dished annular sealing lips 76 and 77 with an annular space 78 therebetween. This arrangement facilitates free individual sealing movements of both lips against a cylindrical surface 79 on the inner race ring 66. The inner radial wall of the reinforcing ring 72 is struck-out in circumferentially spaced relation to provide a series of peripherally spaced angularly disposed fingers 80 embedded within the front portion of the sealing washer and a series of alternating generally radial fingers 82 embedded within the inner portion of the washer 70 as shown.

In the embodiment of FIGURE 4, there is provided a closure member 86 generally similar to that of FIGURES 1 and 2 except that a resiliently deformable synthetic rubber washer 88 molded about a reinforcing ring 90 extends into an annular notch 92 in the inner race ring in a close clearance relation to the side and bottom walls of this notch.

I claim:

In a closure for positioning across an annular lubricant chamber between a pair of relatively rotatable members one of which has an annular groove opening towards the other member, a stamped-out dish-shaped sheet metal reinforcing ring having an outer radial wall and a laterally offset inner radial portion, an annularly extending laterally bent-over flanged portion on the washer periphery extending from said outer radial wall, said inner radial portion having circumferentially spaced angular struck-out finger portions, a molded resilient rubber-like sealing ring formed about and bonded to the inner radial portion and to said struck-out finger portions, said sealing ring having a bifurcated radially inwardly extending portion providing a pair of annular sealing lips for engagement with said other member, and said sealing washer having a disc-like portion bonded to the radial outer portion and terminating at said laterally bent-over flanged portion.

References Cited in the file of this patent

UNITED STATES PATENTS

| | | |
|---|---|---|
| 2,140,091 | Murden | Dec. 13, 1938 |
| 2,257,119 | Johannesen | Sept. 30, 1941 |
| 2,755,113 | Baumheckel | July 17, 1956 |
| 2,766,082 | Ritchey | Oct. 9, 1956 |

FOREIGN PATENTS

| | | |
|---|---|---|
| 700,811 | Great Britain | Dec. 9, 1953 |